(12) United States Patent
Chen et al.

(10) Patent No.: US 9,288,506 B2
(45) Date of Patent: Mar. 15, 2016

(54) SIGNALING VIEW SYNTHESIS PREDICTION SUPPORT IN 3D VIDEO CODING

(75) Inventors: Ying Chen, San Diego, CA (US); Ye-Kui Wang, San Diego, CA (US); Marta Karczweicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 791 days.

(21) Appl. No.: 13/588,370

(22) Filed: Aug. 17, 2012

(65) Prior Publication Data

US 2013/0176389 A1 Jul. 11, 2013

Related U.S. Application Data

(60) Provisional application No. 61/583,469, filed on Jan. 5, 2012.

(51) Int. Cl.
*H04N 13/00* (2006.01)
*H04N 19/597* (2014.01)

(52) U.S. Cl.
CPC .................. *H04N 19/597* (2014.11)

(58) Field of Classification Search
CPC .................................. H04N 19/597
See application file for complete search history.

(56) References Cited

U.S. PATENT DOCUMENTS

| 7,408,986 | B2* | 8/2008 | Winder | 375/240.12 |
| 2007/0052794 | A1* | 3/2007 | Ha et al. | 348/42 |
| 2010/0215100 | A1* | 8/2010 | Jeon et al. | 375/240.12 |
| 2011/0216833 | A1 | 9/2011 | Chen et al. | |
| 2012/0027291 | A1 | 2/2012 | Shimizu et al. | |
| 2012/0056981 | A1 | 3/2012 | Tian et al. | |
| 2012/0062756 | A1* | 3/2012 | Tian et al. | 348/218.1 |

FOREIGN PATENT DOCUMENTS

KR 20070098429 A 10/2007

OTHER PUBLICATIONS

Wenger, et al., JCTVC-F747, "Adaptation Parameter Set (APS)," 6th JCT-VC Meeting, Torino, Jul. 2011.*
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

(Continued)

*Primary Examiner* — Joseph Ustaris
*Assistant Examiner* — Jill Sechser
(74) *Attorney, Agent, or Firm* — Shumaker & Sieffert, P.A.

(57) ABSTRACT

In one example, a video coder is configured to code information indicative of whether view synthesis prediction is enabled for video data. When the information indicates that view synthesis prediction is enabled for the video data, the video coder may generate a view synthesis picture using the video data and code at least a portion of a current picture relative to the view synthesis picture. The at least portion of the current picture may comprise, for example, a block (e.g., a PU, a CU, a macroblock, or a partition of a macroblock), a slice, a tile, a wavefront, or the entirety of the current picture. On the other hand, when the information indicates that view synthesis prediction is not enabled for the video data, the video coder may code the current picture using at least one of intra-prediction, temporal inter-prediction, and inter-view prediction without reference to any view synthesis pictures.

48 Claims, 6 Drawing Sheets

(56) References Cited

OTHER PUBLICATIONS

Fehn, "A 3D-TV Approach Using Depth-image-based Rendering (DIBR)", Visualization, Imaging, and Image Processing (VIIP 2003), Sep. 8, 2003, XP002657820, Benalmadena, Spain Retrieved from the Internet: URL: http://cgit.nutn.edu.tw:8080/cgit/PaperDL/WSY_100624091712.PDF, 6 pp.

Fehn "Depth-image-based rendering (DIBR), compression, and transmission for a new approach on 3D-TV" Proceedings of the International Society for Optical Engineering (S P I E), SPIE, USA LNKD-D01:10.1117/12.524762, vol. 5291, May 31, 2004, XP002444222 ISSN: 0277-786X, pp. 93-104.

Fehn, et al., "3D-TV Using Depth-Image-Based Rendering (DIBR)", 24. Picture Coding Symposium; Dec. 15, 2004-Dec. 17, 2004; San Fransisco, XP030080155, 6 pp.

Hannuksela, et al., Editors: "Working Draft 1 of AVC compatible video with depth information," ISO/IEC/JTC1/SC29/WG11/N12545, Mar. 2012, 65 pp.

International Search Report and Written Opinion—PCT/US2012/071016—ISA/EPO—Jun. 18, 2013, 13 pp.

Yu, et al., "3D-CE1.a related: on Generalized view synthesis prediction (GVSP) mode", MPEG Meeting; Apr. 30, 2012-Apr. 5, 2012; Geneva; (Motion Picture Expert Group or ISO/IEC JTC1/SC29/WG11), No. m24940, XP030053283, 6 pp.

Zhao, et al., "3D-CE1.a: Generalized view synthesis prediction (GVSP) mode", JCT-3V Meeting; MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16 ); URL: HTTP://PHENIX.INT-EVRY.FR/JCT2/, No. JCT3V-A0103, XP030130102, 6 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2012/071016, dated Dec. 11, 2013, 10 pp.

International Preliminary Report on Patentability from International Application No. PCT/US2012/071016, dated Mar. 6, 2014, 13 pp.

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27,-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Telecommunication Union, "Advanced video coding for generic audiovisual services," Standardization Sector of ITU, Jun. 2011, 674 pp.

Wiegand et al.,"WD1: Working Draft 1 of High-Efficiency Video Coding", Joint Collaborative Team on Video Coding, JCTVC-C403, Oct. 7-15, 2010, 137 pp.

Wiegand et al., "WD3: Working Draft 3 of High-Efficiency Video Coding," Joint Collaborative Team on Video Coding, JCTVC-E603, Mar. 16-23, 2011, 193 pp.

Wiegand et al., "WD2: Working Draft 2 of High-Efficiency Video Coding", Joint Collaborative Team on Video Coding, JCTVC-D503, Jan. 20-28, 2011, 153 pp.

* cited by examiner

SIGNALING VIEW SYNTHESIS PREDICTION SUPPORT IN 3D VIDEO CODING

This application claims the benefit of U.S. Provisional Application No. 61/583,469, filed Jan. 5, 2012, which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding information related to view synthesis prediction. View synthesis prediction generally refers to a video coding technique for multi-view video coding in which a synthesized view component is used as a reference picture when coding a picture of a view using inter-view prediction. In some cases, view synthesis prediction may be enabled, while in other cases, view synthesis prediction may be disabled. This disclosure describes techniques relating to signaling whether view synthesis prediction is enabled, e.g., for a bitstream or sub-bitstream (such as an operation point of a multi-view bitstream). In this manner, a video decoding device may determine whether the bitstream or sub-bitstream can be successfully decoded, e.g., based on whether the video decoding device is equipped to perform view synthesis prediction. Moreover, the video decoding device may avoid performing view synthesis when view synthesis prediction is disabled, which may conserve processing resources and battery power.

In one example, a method includes coding information indicative of whether view synthesis prediction is enabled for video data, and when the information indicates that view synthesis prediction is enabled for the video data, generating a view synthesis picture using the video data, and coding at least a portion of a current picture relative to the view synthesis picture. On the other hand, when the information indicates that view synthesis prediction is not enabled for the video data, the method may include coding the current picture using at least one of intra-prediction, temporal inter-prediction, and inter-view prediction without reference to any view synthesis pictures.

In another example, a device includes a video coder configured to code information indicative of whether view synthesis prediction is enabled for video data. When the information indicates that view synthesis prediction is enabled for the video data, the video coder may generate a view synthesis picture using the video data and code at least a portion of a current picture relative to the view synthesis picture.

In another example, a device includes means for coding information indicative of whether view synthesis prediction is enabled for video data, means for generating a view synthesis picture using the video data when the information indicates that view synthesis prediction is enabled for the video data, and means for coding at least a portion of a current picture relative to the view synthesis picture when the information indicates that view synthesis prediction is enabled for the video data.

In another example, a computer-readable storage medium is encoded with instructions that, when executed, cause a programmable processor to code information indicative of whether view synthesis prediction is enabled for video data, and when the information indicates that view synthesis prediction is enabled for the video data, generate a view synthesis picture using the video data and code at least a portion of a current picture relative to the view synthesis picture.

The details of one or more examples are set forth in the accompanying drawings and the description below. Other features, objects, and advantages will be apparent from the description and drawings, and from the claims.

DETAILED DESCRIPTION

Figure 1:
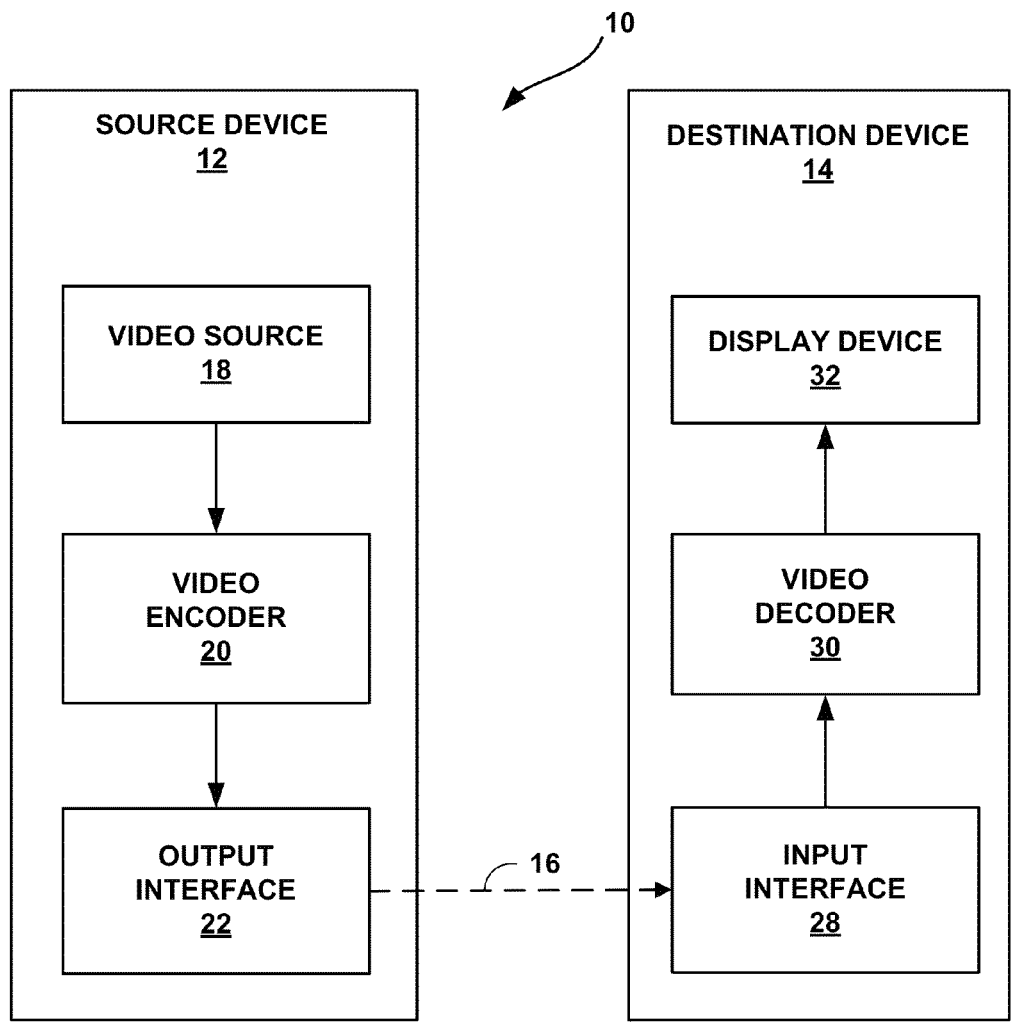
FIG. 1 is a block diagram illustrating an example video encoding and decoding system that may utilize techniques for coding information related to view synthesis prediction.

In general, this disclosure describes techniques for coding and processing multiview video data, e.g., video data used to produce a three-dimensional (3D) effect. In particular, this disclosure relates to view synthesis prediction support signaling in a 3D video coding process.

To produce a three-dimensional effect in video, two views of a scene, e.g., a left eye view and a right eye view, may be shown simultaneously or nearly simultaneously. Two pictures of the same scene, corresponding to the left eye view and the right eye view of the scene, may be captured (or generated, e.g., as computer-generated graphics) from slightly different horizontal positions, representing the horizontal disparity between a viewer's left and right eyes. By displaying these two pictures simultaneously or nearly simultaneously, such that the left eye view picture is perceived by the viewer's left eye and the right eye view picture is perceived by the viewer's right eye, the viewer may experience a three-dimensional video effect.

This disclosure is related to 3D video coding based on advanced codecs, including the coding of two or more views of a picture with depth maps. In general, the techniques of this disclosure may be applied to any of a variety of different video coding standards. For example, these techniques may be applied to the multi-view video coding (MVC) extension of ITU-T H.264/AVC (advanced video coding), to a 3D video (3DV) extension of the upcoming High Efficiency Video Coding (HEVC) standard, or other coding standard. A recent draft of the upcoming HEVC standard is described in document HCTVC-11003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012, which, as of Aug. 2, 2012, is downloadable from http://phenix.it-sudparis.eu/jct/doc_end_user/documents/9_Geneva/wg11/JCTVC-I1003-v10.zip. For purposes of illustration, the techniques of this disclosure are described primarily with respect to either the MVC extension of ITU-T H.264/AVC or to the 3DV extension of HEVC. However, it should be understood that these techniques may be applied to other standards for coding video data used to produce a three-dimensional effect as well.

Video coding techniques related to multi-view coding (or stereo view coding) may generally include inter-view prediction and/or coding depth information. Inter-view prediction generally includes coding pictures of a base view using standard intra-prediction or inter-prediction, then predicting pictures of other views relative to the base view or other views. In this manner, some pictures of a non-base view may be predicted relative to pictures of the base view or another non-base view.

Typically, when a picture is coded relative to a reference picture, video coding devices signal the reference picture as a member of a reference picture list. Thus, for inter-view coding, reference pictures added to the reference picture list may include pictures of other views, in addition to other pictures of the current view, e.g., for temporal prediction. The reference picture list construction process can flexibly arrange temporal and view prediction references. This may provide not only potential coding efficiency gain but also error resilience, since reference picture selection and redundant picture mechanisms can then be extended to the view dimension. The reference picture list construction may include the following steps: 1) the reference picture list initialization process for temporal (intra-view) reference pictures (e.g., as specified in ITU-T H.264/AVC), wherein reference pictures from other views are not considered; 2) the inter-view reference pictures are appended to the end of the list, e.g., in the order they occur in the MVC SPS extension; and 3) the reference picture list reordering (RPLR) process for both intra-view and inter-view reference pictures is applied, where inter-view reference pictures may be identified in the RPLR commands by their index values as specified in, e.g., the MVC SPS extension.

As noted above, the techniques of this disclosure may be applied to a 3DV extension of HEVC. The Moving Picture Experts Group (MPEG) recently started the 3D video standardization activity based on HEVC. In the current context of 3D video (3DV), video coders may code both texture information (e.g., luminance/brightness and chrominance/color) and depth information for each view of a multiview bitstream. This is in contrast to an MVC bitstream of ITU-T H.264/AVC, in which a multiview bitstream is simply a bitstream containing multiple views with texture information only. A 3DV bitstream, in the context of 3D video standardization based on HEVC, may include a coded representation of multiple views, each of which may contain both texture information (texture view components) and depth information (depth view components). Though 3DV also contains texture of multiple views, in some cases, a 3DV bitstream may be compatible to a multiview bitstream. Thus, it is straightforward that the coding tools and high level mechanisms used in the multiview extension of HEVC may be reused or extended in a backward compatible manner in the 3DV extension of HEVC, or other coding standards.

By providing depth information, a device may render pictures for various views other than those provided in the bitstream. For example, if two views with depth information are provided in a bitstream, a client device may use the depth information to generate a picture for a third view, e.g., between the two coded views of the bitstream. Generation of such pictures is referred to as depth image based rendering (DIBR). DIBR can be used to generate a view based on available texture and depth images. Such a generation process is called view synthesis. View synthesis can be used for post-processing following decoding of the views (also referred to as "post-loop" view synthesis). Additionally or alternatively, view synthesis may be used to generate reference pictures used for inter-view prediction (also referred to as "in-loop" view synthesis). It should be understood that DIBR may be used to render a texture picture, a depth picture (typically referred to as a depth map), or both. In general, depth maps are represented similar to luminance (luma) data of texture pictures, without including chrominance information, except that the pixel values of the depth map represent depth for corresponding texture information, rather than brightness information.

A reference picture generated using view synthesis, sometimes referred to as a view synthesis reference picture (VSRP), can be used as a reference picture similar to a temporal inter-prediction reference picture or an inter-view reference picture. A VSRP can be included in a reference picture list. In some specific designs of conventional coding techniques, multiple views (with depth) can be used to generate just one VSRP through DIBR. Thus, for a picture that is currently being coded, only one VSRP may be available in these conventional coding techniques.

In the context of a video coding standard, a "profile" corresponds to a subset of algorithms, features, or tools and constraints that apply to the algorithms, features, and tools. As defined by HEVC WD7, for example, a "profile" is "a subset of the entire bitstream syntax that is specified by HEVC WD7. A "level," as defined by HEVC WD7, is "a specified set of constraints imposed on values of the syntax elements in the bitstream. These constraints may be simple limits on values. Alternatively they may take the form of constraints on arithmetic combinations of values (e.g., picture width multiplied by picture height multiplied by number of pictures decoded per second)." In this manner, level values may correspond to limitations of decoder resource consumption, such as, for example, decoder memory and computation, which may be related to the resolution of the pictures, bit rate, and macroblock (MB) or largest coding unit (LCU) processing rate. A profile may be signaled with a profile_idc (profile indicator) value, while a level may be signaled with a level_idc (level indicator) value.

An operation point generally corresponds to a subset of decodable/displayable views of a full set of views of a bitstream including a plurality of views. For example, if a bitstream includes eight views, an operation point may correspond to three of the eight views that can be properly decoded and displayed without the other five views. As defined in the MVC extension of ITU-T H.264/AVC, an operation point is:

identified by a temporal_id value representing the target temporal level and a set of view_id values representing the target output views. One operation point is associated with a bitstream subset, which consists of the target output views and all other views the target output views depend on, that is derived using the sub-bitstream extraction process as specified in subclause H.8.5.3 [of ITU-T H.264/AVC] with tIdTarget equal to the temporal_id value and viewIdTargetList consisting of the set of view_id values as inputs. More than one operation point may be associated with the same bitstream subset. When the specification states "an operation point is decoded" it refers to the decoding of a bitstream subset corresponding to the operation point and subsequent output of the target output views.

This disclosure recognizes certain problems that may arise with conventional coding techniques, e.g., of a 3DV extension of HEVC and the MVC extension of ITU-T H.264/AVC. For example, there may be certain profiles, levels, or operation points of 3D video coding bitstreams that do not support VSRP. Currently, there is no indication whether a video coder coding the bitstream does not need to do view synthesis prediction at all. Thus, absent the techniques of this disclosure, a video coding device may unnecessarily generate a VSRP, which may decrease processing efficiency and lead to wasted processing cycles, which may cause unnecessary battery consumption. Additionally, even when view synthesis prediction is enabled, it is possible that one view component or one slice of a view component does not use view synthesis. This may also lead to wasted processing cycles and/or unnecessary battery consumption. In general, always creating a view synthesis picture may lead to unnecessary, wasted computations.

This disclosure describes various techniques for reducing or eliminating unnecessary computations with respect to view synthesis prediction. For example, video coding devices, e.g., video encoders and video decoders, may code a flag in a parameter set, such as a sequence parameter set (SPS), that indicates whether pictures corresponding to the parameter set (e.g., the SPS) have view synthesis enabled. In some video coding profiles, e.g., certain 3DV profiles, this flag may always be set to zero, to indicate that view synthesis prediction is disabled for video data corresponding to that profile. Additionally or alternatively, video coding devices may code a flag in a slice header to indicate whether the corresponding slice is coded using view synthesis prediction. Alternatively, this flag may be coded in a picture parameter set (PPS) or adaptation parameter set (APS) for the slice. In this manner, video coding devices may code information indicating whether view synthesis prediction is enabled, and only when view synthesis prediction is enabled, generate a view synthesis picture and code a current picture relative to the generated view synthesis picture.

Similarly, in AVC based 3DV, there is a parameter set, namely depth parameter set (also referred to as the depth range parameter set), which may be changed in an access unit basis and contain information related to depth range and potentially camera parameters. A flag can be present in the depth parameter set, indicating whether the view synthesis prediction is enabled for slices referring to the depth parameter set. In this manner, adaptation parameter sets and depth parameter sets represent examples of access unit level parameter sets.

FIG. 1 is a block diagram illustrating an example video encoding and decoding system 10 that may utilize techniques for coding information related to view synthesis prediction. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding information related to view synthesis prediction. In other examples, a source device and a destination device may include other components or arrangements. For example, source device 12 may receive video data from an external video source 18, such as an external camera. Likewise, destination device 14 may interface with an external display device, rather than including an integrated display device.

Video source 18 may provide multiple views of video data to video encoder 20. For example, video source 18 may correspond to an array of cameras, each having a unique horizontal position relative to a particular scene being filmed. Alternatively, video source 18 may generate video data from disparate horizontal camera perspectives, e.g., using computer graphics. In some cases, video source 18 may also be configured to capture or generate, or otherwise provide, depth data to video encoder 20, while in other cases, video encoder 20, or another unit of source device 12, may calculate depth data based on, for example, horizontal disparity between pictures of different views.

The illustrated system 10 of FIG. 1 is merely one example. Techniques for coding information related to view synthesis prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device. In some examples, display device 32 may comprise a device capable of displaying two or more views simultaneously or substantially simultaneously, e.g., to produce a 3D visual effect for a viewer. Display device 32 may be configured to use depth information to render pictures of a virtual view. Alternatively, a separate unit of destination device 14 may render pictures of a virtual view using depth information.

Video encoder 20 and video decoder 30 may operate according to a video coding standard, such as the High Efficiency Video Coding (HEVC) standard presently under development or a 3DV extension thereof. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, such as the MVC extension of ITU-T H.264/AVC. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding (e.g., temporal inter-prediction or inter-view prediction) using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, video encoder 20 and video decoder 30 may be configured to code information indicating whether view synthesis prediction is enabled for a particular bitstream or sub-bitstream (e.g., an operation point of a bitstream including multiple views). Video encoder 20, for example, may be configured to determine whether to enable view synthesis prediction for a bitstream or sub-bitstream. For example, video encoder 20 may code a bitstream that is to be backwards compatible with video decoders that were not equipped to perform view synthesis prediction. Alternatively, video encoder 20 may determine that view synthesis prediction does not yield improved coding results over other conventional coding methods, and that therefore view synthesis prediction should not be enabled. In any case, video encoder 20 may encode information indicating whether view synthesis prediction is enabled for a bitstream or sub-bitstream. Video decoder 30, in turn, may decode the information indicating whether view synthesis prediction is enabled, and generate view synthesis pictures for use as reference pictures (also referred to as view synthesis reference pictures or VSRPs) only when the information indicates that view synthesis prediction is enabled.

In general, to perform view synthesis prediction, a video coder, such as video encoder 20 or video decoder 30, may use texture and depth information of one or more views to generate a synthesized view component. This process is substantially similar to the process for generating a synthesized view component using texture and depth information for purposes of display. However, in view synthesis prediction, a synthesized view component (that is, a picture) may be added to a reference picture list for use as a reference picture when coding a different view. View synthesis prediction may be used to generate reference pictures for coding texture information or depth information. Of course, the generated view synthesis pictures may also be displayed by a client device as part of playback. Additionally or alternatively, video decoder 30, or another unit of destination device 14, such as a post-processing unit (not shown), may perform view synthesis for the purposes of generating synthesized pictures for playback. It should be understood that, although view synthesis pictures used for prediction may be displayed, in some examples, a separate picture may be generated using DIBR for purposes of display. View synthesis images for the purposes of prediction may be generated during coding or "in loop," while view synthesis images for the purposes of display may be generated either "in loop" or "post loop," that is, following coding.

In some examples, video encoder 20 and video decoder 30 may be configured to code information indicating whether view synthesis prediction is enabled as a syntax element of a parameter set, such as a video parameter set (VPS), sequence parameter set (SPS), picture parameter set (PPS), or adaptation parameter set (APS). In general, a VPS applies to one or more layers (e.g., one or more views) of a bitstream, an SPS applies to a sequence of pictures of a particular layer (e.g., starting with an instantaneous decoder refresh (IDR) picture and ending with a picture just before a subsequent IDR picture), a PPS applies to an individual picture, and an APS applies to an individual slice of a picture. Video encoder 20 and video decoder 30 may code a syntax element indicating whether view synthesis prediction is enabled in any or all of the above data structures, e.g., a VPS, an SPS, a PPS, and/or an APS.

In some examples, video encoder 20 and video decoder 30 may code syntax elements in the SPS, PPS, and APS in a hierarchical fashion. For example, if a syntax element in the SPS indicates that view synthesis prediction is not enabled, syntax elements in the PPS and APS need not be signaled, because view synthesis prediction is disabled for the entire sequence. Thus, if the syntax element in the SPS indicates that view synthesis prediction is not enabled, video decoder 30 may infer values for syntax elements of the PPSs and APSs of pictures and slices of pictures in the sequence corresponding to the SPS, where the inferred value is a value indicating that view synthesis prediction is disabled.

As another example, if a syntax element in the SPS indicates that view synthesis prediction is enabled, an additional syntax element may be provided in the PPS to indicate whether view synthesis prediction is enabled for a particular corresponding picture. Additionally or alternatively, if a syntax element in the SPS indicates that view synthesis prediction is enabled, an additional syntax element may be provided in the APSs for each slice of a particular picture such that the syntax elements, regarding view synthesis prediction, of the APSs for the slices of the same picture have the same value. In general, view synthesis involves synthesizing a full reference picture, and therefore, if view synthesis prediction is enabled for one slice of a picture, view synthesis prediction is considered to be enabled for all slices of the picture. In some examples, video encoder 20 and video decoder 30 may, additionally or alternatively, code a syntax element in a slice header of a slice. Furthermore, similar syntax elements may be individually signaled for tiles or wavefronts of a picture, in addition to or in the alternative to signaling for slices as described above.

Table 1 below provides an example set of syntax for an SPS in accordance with certain examples of the techniques of this disclosure. In this example, the SPS is an SPS extension for 3DV. Thus, other syntax elements of a base coding standard (represented by ellipses in Table 1), such as ITU-T H.264/AVC or HEVC, may remain the same as defined in the corresponding base coding standard.

TABLE 1

|  | C | Descriptor |
|---|---|---|
| seq_parameter_set_3dvc_extension( ) { | | |
| ... | | |
| seq_view_synthesis_enabled_flag | 0 | u(1) |
| ... | | |
| } | | |

As shown in the example of Table 1, seq_parameter_set_3dvc_extension( ) represents an example of an extension for the subset SPS of ITU-T H.264/AVC. However, seq_view_synthesis_enabled_flag may alternatively be signaled directly in the SPS itself, e.g., as shown in Table 2:

TABLE 2

|  | Descriptor |
|---|---|
| seq_parameter_set_data( ) { | |
| ... | |
| seq_view_synthesis_enabled_flag | u(1) |
| ... | |
| } | |

Semantics for seq_view_synthesis_enabled_flag may be defined as follows: seq_view_synthesis_enabled_flag equal to 1 may indicate that view components (texture or depth view components) referring to this SPS may use view synthesis prediction mode. Seq_view_synthesis_enabled_flag equal to 0 may indicate that no view components referring to this SPS uses view synthesis. Semantics for other syntax elements (represented by ellipses in Tables 1 and 2) may remain substantially similar to the semantics as defined for these syntax elements in the respective coding standard.

Table 3 below provides an example set of syntax for a PPS in accordance with certain examples of the techniques of this disclosure.

TABLE 3

| | Descriptor |
|---|---|
| pic_parameter_set_rbsp( ) { | |
|   pic_parameter_set_id | ue(v) |
|   seq_parameter_set_id | ue(v) |
|   ... | |
|   if (seq_view_synthesis_enabled_flag) | |
|     pic_view_synthesis_enabled_flag | |
|   ... | |
|   rbsp_trailing_bits( ) | |
| } | |

In the example of Table 3, it is presumed that an SPS corresponding to seq_parameter_set_id has signaled a value for seq_view_synthesis_enabled_flag, indicating whether view synthesis prediction is enabled for the sequence. Thus, if view synthesis prediction is not enabled for the sequence, the PPS need not include a value for pic_view_synthesis_enaled_flag, and video decoder 30 may infer the value for pic_view_synthesis_enaled_flag to be, e.g., zero. Alternatively, pic_view_synthesis_enabled_flag can be directly signaled without the signaling of seq_view_synthesis_enabled_flag (in other words, the syntax for the PPS may be equivalent to seq_view_synthesis_enabled_flag always being equal to 1).

Semantics for the syntax element pic_view_synthesis_enabled_flag may be defined as follows: pic_view_synthesis_enabled_flag equal to 1 may indicate that view components (texture or depth view components) referring to this PPS may use view synthesis prediction. Pic_view_synthesis_enabled_flag equal to 0 may indicate that no view components referring to this PPS uses view synthesis. Semantics for other syntax elements may remain substantially similar to the semantics as defined for these syntax elements in the respective coding standard.

Table 4 below provides an example set of syntax for an APS in accordance with certain examples of the techniques of this disclosure.

TABLE 4

| | Descriptor |
|---|---|
| aps_rbsp( ) { | |
|   aps_id | ue(v) |
|   ... | |
|   if (ViewSynthesisEnabled) | |
|     aps_view_synthesis_enabled_flag | |
|   ... | |
|   rbsp_trailing_bits( ) | |
| } | |

In the example of Table 4, ViewSynthesisEnabled may be derived to have a value of 0 (that is, "false") if seq_view_synthesis_enabled_flag (e.g., of Tables 1 or 2) is equal to 0 or pic_view_synthesis_enabled_flag (e.g., of Table 3) is equal to 0. As shown in the example of Table 4, aps_view_synthesis_enabled_flag is signaled only when ViewSynthesisEnabled has a value of 1 (that is, "true"). Thus, if either seq_view_synthesis_enabled_flag or pic_view_synthesis_enabled_flag indicates that view synthesis prediction is not enabled for a corresponding sequence or picture, a value for aps_view_synthesis_enabled_flag need not be signaled, and instead, video decoder 30 may infer a value for aps_view_synthesis_enabled_flag as indicating that view synthesis prediction is not enabled for a corresponding slice. Alternatively, aps_view_synthesis_enabled_flag can be directly signaled without the signaling of seq_view_synthesis_enabled_flag or pic_view_synthesis_enabled_flag.

Semantics for aps_view_synthesis_enabled_flag may be defined as follows: aps_view_synthesis_enabled_flag equal to 1 may indicate that view components (texture or depth view components) referring to this APS may use view synthesis prediction. Aps_view_synthesis_enabled_flag equal to 0 may indicate that no view components referring to this APS uses view synthesis. Semantics for other syntax elements of the APS may remain substantially similar to the semantics defined in the respective video coding standard.

In some examples, in addition to or in the alternative to signaling a syntax element in an APS indicating whether view synthesis prediction is enabled for a corresponding slice, a syntax element may be signaled in a slice header that indicates whether view synthesis prediction is enabled for the corresponding slice. Table 5 provides an example set of syntax for a slice header in accordance with certain examples of the techniques of this disclosure.

TABLE 5

| | Descriptor |
|---|---|
| slice_header( ) { | |
|   ... | |
|   if (ViewSynthesisEnabled) | |
|     view_synthesis_flag | u(1) |
|   ... | |
| } | |

As discussed with respect to Table 4, ViewSynthesisEnabled may be derived to be 0 if seq_view_synthesis_enabled_flag is signaled and equal to 0 (that is, "false") or pic_view_synthesis_enabled_flag is signaled and equal to 0 (that is, "false"). In the context of HEVC based 3DV, or other coding standards in which an APS is signaled including a syntax element indicative of whether view synthesis prediction is enabled, ViewSynthesisEnabled may be derived to be 0 if aps_view_synthesis_enabled_flag is signaled and equal to 0 (that is, "false").

Semantics for the view_synthesis_flag of Table 5 may be defined as follows: view_synthesis_flag equal to 1 may indicate that the current slice may be view synthesis predicted thus the view synthesis reference picture is to be generated. View_synthesis_flag equal to 0 may indicate that the current slice is not view synthesis predicted thus the view synthesis reference picture need not be generated. When not present, this flag may be inferred to be equal to 0.

In the current version of ITU-T H.264/AVC based 3DV, a picture may be divided into multiple slices. In other coding standards, such as HEVC, a picture may be divided into other regions, such as tiles or wavefronts. The techniques described above with respect to slices (e.g., signaling a syntax element in a slice header and/or in an APS header) may also be applied to other sub-picture regions, such as tiles or wavefronts.

In some examples, video encoder 20 and video decoder 30 may be configured such that multiple slices of a common picture have the same value of a view_synthesis_flag. That is, a constraint may be introduced such that all slices of a picture have the same value for view_synthesis_flag. In this manner, when the slice header of a first slice (that is, an ordinal first slice) of a view component is parsed, and the view_synthesis_flag is equal to 1 (one), the view synthesis picture (for each pixel) may be generated and can be used for all slices in the same view component, due to the constraint. On the other hand, in this example, if the view_synthesis_flag of the first slice is equal to 0 (zero), the view synthesis picture is not generated for any slice of the current view component for purposes of view synthesis prediction, due to the constraint.

In some examples, video encoder 20 and video decoder 30 may instead be configured such that multiple slices of a common picture may have different values for view_synthesis_flag. When a slice header of a slice of a view component having view_synthesis_flag equal to 1 is parsed, the view synthesis reference picture (for each pixel) may be generated for that view component. Alternatively, a view synthesis prediction process may only apply to the regions related to (e.g., co-located with, or co-located with after horizontal offset due to disparity) the current slice with view_synthesis_flag equal to 0.

In some examples, when view_synthesis_flag is not signaled in the slice header, and if ViewSynthesisEnabled is equal to 1 (one), after reference picture list construction, video encoder 20 and video decoder 30 may perform a check to determine whether view synthesis prediction is to be used to generate a reference picture for a current slice. Such a check may be performed for each entry of each reference picture list, and if one entry of a reference picture list has a picture order count (POC) value equal to the POC value of the current slice, view synthesis prediction may be determined to be used for the current slice. Moreover, when view synthesis prediction is used for the current slice, video encoder 20 and video decoder 30 may be configured to generate the view synthesis picture to be used as a reference picture.

Alternatively, if the check results in a determination that view synthesis prediction is to be used, video encoder 20 and video decoder 30 may only perform view synthesis prediction to generate reference regions related to the current slice. Video encoder 20 and video decoder 30 may be defined with padding areas, video encoder 20 and video decoder 30 may synthesize values for pixels in the co-located slice region and the padding areas.

In general, video encoder 20 and video decoder 30 may generate a reference picture using view synthesis prediction using texture and depth information of one or two reference views. When two reference views are taken into consideration, typically, one of the reference views is on the left of the current view, while the other reference view is on the right of the current view being coded, that is, the target view of the view synthesis.

After video encoder 20 and video decoder 30 identify a reference view, when decoding a view component (including texture and depth information), video encoder 20 and video decoder 30 may further identify a reference view component using the identified view, and texture or depth information (or both) may be used to code the current view component within the same access unit. Video encoder 20 and video decoder 30 may be configured to code a reference view identifier using, e.g., a view identifier (view_id) value or using horizontal translation information. Video encoder 20 and video decoder 30 may use the identified reference view (or reference views) to synthesize a view component for use as a reference picture.

As noted above, in some examples, video encoder 20 and video decoder 30 may code identifying information for a reference view to be used to synthesize a view component using a view_id value. For a current view with view order index equal to VOIdx, any view with a view order index smaller than the current view and a view_id closest to the view_id of the current view (viewID) may be identified as a reference view. Among the views with a view order index smaller than VOIdx and view_id smaller than viewID, the view with the largest view_id may be identified as the first reference view. Among the views with a view order index smaller than VOIdx and view_id larger than view_id, the view with smallest view_id may be identified as the second reference view.

In examples where view_id values are used to identify reference views for view synthesis prediction, if both first reference view and second reference view can be identified, video encoder 20 and video decoder 30 may synthesize the view synthesis reference picture from these two reference views, if two reference views are allowed. Otherwise, video encoder 20 and video decoder 30 only synthesize the view synthesis reference picture from one reference view. If only one reference view is allowed and the first and second reference views are both identified, the one with a closer view_id may be chosen. If both reference views have the same distance of view_id, video encoder 20 and video decoder 30 may be configured to select the reference view with a smaller (or larger) view_id.

In some examples, video encoder 20 and video decoder 30 may be configured to use horizontal translation information to identify reference views for view synthesis prediction. If two reference views are allowed, among the views with a view order index smaller than VOIdx and horizontal translation smaller than the horizontal translation of the current view, the view with the closest horizontal location may be identified as the first reference view. Among the views with a view order index smaller than VOIdx and horizontal translation larger than the current view, the view with the closest horizontal location may be identified as the second reference view.

In examples where horizontal translation information is used to identify reference views, if both the first reference view and the second reference view can be identified, video encoder 20 and video decoder 30 may synthesize the view synthesis reference picture from these two reference views if two reference views are allowed. Otherwise, video encoder 20 and video decoder 30 may only synthesize the view synthesis reference picture from one reference view. If only one reference view is allowed and the first and second reference views are both identified, the one with a closer horizontal location may be chosen. If both reference views have the same distance to the current view, video encoder 20 and video decoder 30 may be configured to select the one on the left (or right).

In general, video encoder 20 and video decoder 30 may be configured to operate in substantially the same manner when choosing reference views for view synthesis. Thus, in some cases where only one reference view is to be used and two different reference views may yield approximately the same results, video encoder 20 and video decoder 30 may be configured such that they select the same reference view, such that additional syntax elements need not be signaled to explicitly identify the reference view.

In this manner, video encoder 20 and video decoder 30 represent examples of a video coder configured to code information indicative of whether view synthesis prediction is enabled for video data, and when the information indicates that view synthesis prediction is enabled for the video data, to generate a view synthesis picture using the video data, and to code at least a portion of a current picture relative to the view synthesis picture. On the other hand, when the information indicates that view synthesis prediction is not enabled, the video coder may be configured to code the current picture using at least one of intra-prediction, temporal inter-prediction, and inter-view prediction without reference to any view synthesis pictures. Accordingly, the video coder may be configured to generate a view synthesis picture to be used as a reference picture only when the information indicates that view synthesis prediction is enabled; otherwise, view synthesis may be skipped, which may conserve processing resources and/or battery power.

The information indicative of whether view synthesis prediction is enabled for video data may be signaled in a parameter set, such as a VPS, SPS, PPS, or APS, and/or in a slice header, as explained above with respect to Tables 1-5. This information may comprise a syntax element in any or all of these data structures, alone or in any combination. Furthermore, as explained above, the video coder may be configured to code identifying information for one or more reference views to use to generate a view synthesis picture to be used as a reference picture, e.g., using a view_id value or horizontal translation information for the one or more reference views.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
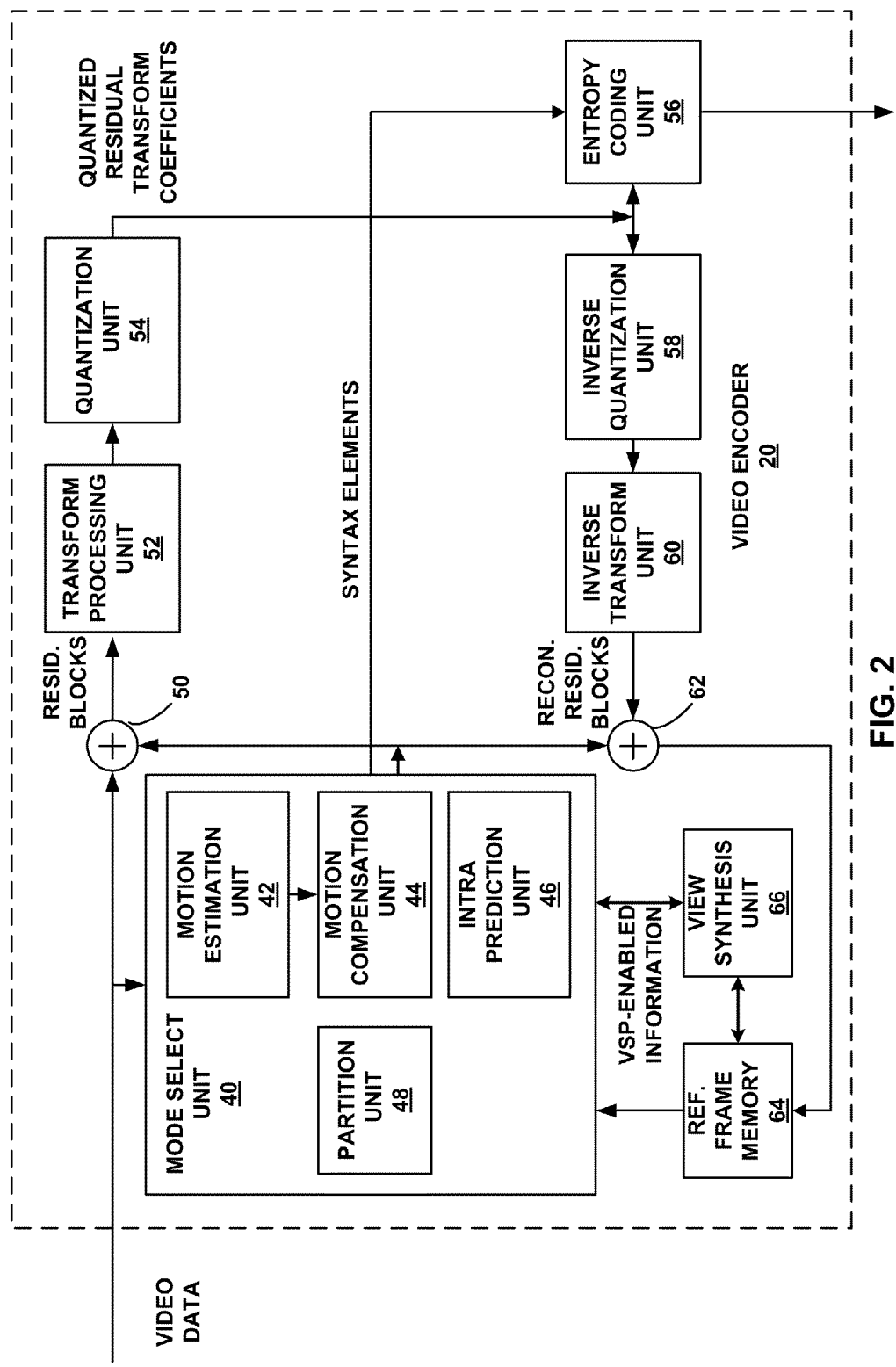
FIG. 2 is a block diagram illustrating an example of a video encoder that may implement techniques for coding information related to view synthesis prediction.

FIG. 2 is a block diagram illustrating an example of video encoder 20 that may implement techniques for coding information related to view synthesis prediction. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, such as intra, temporal inter, or inter-view prediction, e.g., based on error results, and provides a predicted block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56. In some examples, mode select unit 40 may be configured to select inter-view prediction, e.g., relative to a previously coded view or to a synthesized view for view synthesis prediction. As discussed in greater detail below, view synthesis unit 66 may be configured to synthesize a view (that is, synthesize pictures, including texture and/or depth pixel values) for view synthesis prediction. For example, view synthesis unit 66 may be configured to perform techniques substantially similar to depth-image based rendering (DIBR).

Moreover, mode select unit 40 may provide syntax information indicative of a selected coding mode for the PU to entropy coding unit 56. It should be understood that where view synthesis prediction is enabled, mode select unit 40 may still select from among the other available coding modes, e.g., intra-prediction, temporal inter-prediction, or inter-view prediction relative to a previously coded picture. Thus, video encoder 20 may provide an indication of which coding mode is selected for a block of video data, separate from information indicating whether view synthesis prediction is enabled.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. Motion vectors may include temporal motion vectors, which describe motion of a block relative to a previously coded block of the same view in a temporally distinct picture, and disparity motion vectors, which describe disparity between similar blocks in different views (having different horizontal camera perspectives) but that may have the same temporal position. In some cases, motion vectors may describe motion with respect to a temporally distinct picture that is also in a different view.

In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

When performing inter-view prediction, motion estimation unit 42 may calculate disparity motion vectors relative to either previously coded pictures of a different view or synthesized pictures for view synthesis prediction. Thus, motion estimation unit 42 may also be referred to as a motion/disparity estimation unit. In general, synthesized pictures may be stored in reference frame memory 64 by view synthesis unit 66, and therefore, motion estimation unit 42 and motion compensation unit 44 need not be configured to determine whether a reference picture is a previously coded picture of a different view or a synthesized picture from a view synthesis process. The process for searching for a disparity motion vector may be restricted to searching horizontally, rather than both horizontally and vertically, because pictures of different views at the same temporal position typically only include horizontal differences and not vertical differences due to pictures of a scene being captured or generated from disparate horizontal camera perspectives.

Motion estimation unit 42 calculates a motion vector (e.g., a temporal motion vector or a disparity motion vector) for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42, which again may be a temporal motion vector or a disparity motion vector. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below.

In general, motion estimation unit 42 performs motion estimation relative to luma components, and motion compensation unit 44 uses motion vectors calculated based on the luma components for both chroma components and luma components. Motion estimation unit 42 and motion compensation unit 44 may be configured to either reuse motion vectors from luma components to code depth maps, or to independently calculate motion vectors for depth maps. Thus, in some cases, motion estimation 42 and motion compensation unit 44 may be configured to predict depth maps in a manner similar to chroma components or in a manner similar to luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction (e.g., temporal inter-prediction and/or inter-view prediction) performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Moreover, as noted above, mode select unit 40 may determine whether to utilize view synthesis prediction to code a particular block of a non-base view. Mode select unit 40 may receive configuration data that indicates whether view synthesis prediction is enabled for a bitstream or for a particular operation point of a multi-view bitstream. For example, a user may have provided configuration data indicating that the bitstream is to be compatible with devices that are not equipped to perform view synthesis prediction, in which case mode select unit 40 may disable view synthesis prediction for the entire bitstream. Alternatively, the configuration data may indicate a subset of views, forming an operation point, for which view synthesis prediction is disabled, in which case mode select unit 40 may disable view synthesis prediction for each of the views in the subset, but test view synthesis prediction for other views of the bitstream not included in the subset.

In general, assuming that view synthesis prediction is permitted for a particular non-base view, mode select unit 40 may test view synthesis prediction for blocks of pictures of the non-base view to determine whether view synthesis prediction yields better performance than other coding modes, e.g., temporal inter-prediction, intra-prediction, and/or inter-view prediction relative to a previously coded (non-synthesized) view. Mode select unit 40 may test the performance of various coding modes using rate-distortion optimization (RDO), and/or using Bjontegaard-Delta rates (BD-rates). In general, rate-distortion optimization is a measure of the number of bits needed to code a set of video data using a particular mode or combination of modes, relative to the amount of distortion introduced by the mode or combination of modes. Mode select unit 40 may select the mode or combination of modes that yield the best performance as indicated by these measures.

Furthermore, mode select unit 40 may determine a number of blocks in a slice, picture, sequence, or other coded unit (e.g., a tile or wavefront) for which view synthesis prediction yields the best performance, and determine whether this number of blocks is sufficiently high to justify the processing expense of using view synthesis prediction. As noted above, synthesizing a view by a video decoder may require a fairly large amount of processing resources, and therefore, mode select unit 40 may select a different coding mode for a particular block aside from view synthesis prediction if there are not a sufficiently large number of blocks in the coded unit for which view synthesis prediction is to be used.

Mode select unit 40 may determine whether view synthesis prediction is to be enabled for a coded unit (e.g., a sequence, a picture, a slice, a tile, a wavefront, or other similar coded unit) in a hierarchical fashion. For example, if view synthesis prediction is to be enabled for one of a slice, tile, or wavefront, mode select unit 40 may indicate that view synthesis prediction is enabled for a picture including the slice, tile, or wavefront, e.g., using the syntax of any or all of Tables 3-5 (and/or similar syntax for a tile or wavefront, e.g., in a tile header or wavefront header). Additionally or alternatively, if view synthesis prediction is to be enabled for one of a picture, slice, tile, or wavefront, mode select unit 40 may indicate that view synthesis prediction is enabled for a sequence of pictures including the picture, slice, tile, or wavefront, e.g., using the syntax of either of Tables 1 and 2. Mode select unit 40 may provide appropriate syntax data to entropy coding unit 56, which may code the data structures of any or all of Tables 1-5 accordingly.

View synthesis unit 66 represents a unit that synthesizes views for inter-view prediction. Mode select unit 40 may provide information indicating whether view synthesis prediction (VSP) is enabled for a particular picture or view (labeled "VSP-ENABLED INFORMATION" in FIG. 2). When view synthesis prediction is enabled, view synthesis unit 66 may synthesize a picture for a synthesized view using texture and depth information stored in reference frame memory 64.

View synthesis unit 66 may use one or more reference views to synthesize another view. In some examples, view synthesis unit 66 may determine a horizontal location for the view to be synthesized, determine horizontal locations for previously coded views, and then select reference views based on the horizontal locations of the previously coded views. For example, view synthesis unit 66 may select a first reference view having a horizontal location that is closest to the left of the horizontal location of the view to be synthesized, and a second reference view having a horizontal location that is closest to the right of the horizontal location of the view to be synthesized.

View synthesis unit 66 may identify a reference view using view_ids and/or horizontal offset information. In examples where view_id values are used to identify reference views for view synthesis prediction, if both first reference view and second reference view can be identified, view synthesis unit 66 may synthesize the view synthesis reference picture from these two reference views, if two reference views are allowed. Otherwise, view synthesis unit 66 may only synthesize the view synthesis reference picture from one reference view. If only one reference view is allowed and the first and second reference views are both identified, the one with a closer view_id may be chosen. If both reference views have the same distance of view_id, view synthesis unit 66 may be configured to select the reference view with a smaller (or larger) view_id. In some examples, syntax information indicating whether the smaller or larger view_id is to be chosen may be provided, e.g., in an SPS or VPS, assuming that view synthesis prediction is indicated as being enabled.

In examples where horizontal translation information is used to identify reference views, if both the first reference view and the second reference view can be identified, view synthesis unit 66 may synthesize the view synthesis reference picture from these two reference views if two reference views are allowed. Otherwise, view synthesis unit 66 may only synthesize the view synthesis reference picture from one reference view. If only one reference view is allowed and the first and second reference views are both identified, the one with a closer horizontal location may be chosen. If both reference views have the same distance to the current view, view synthesis unit 66 may be configured to select the one on the left (or right). In some examples, syntax information indicating whether the left or right horizontal location is to be chosen may be provided, e.g., in an SPS or VPS, assuming that view synthesis prediction is indicated as being enabled.

In general, to synthesize a picture, view synthesis unit 66 may use texture and depth information of one or more previously coded views. View synthesis unit 66 may calculate horizontal disparity for the texture information based on the corresponding (e.g., substantially co-located) depth information of a texture picture and a corresponding depth map. In general, objects that are to appear at the depth of the display (e.g., at the plane of convergence) may have a disparity of zero. That is, pixels representative of this object may have substantially the same horizontal position in the synthesized view as in the reference view. For objects to be displayed in front of the screen, a positive disparity may be assigned, such that in a "left eye" picture, pixels for the object are positioned to the right of corresponding pixels in the "right eye" picture. Alternatively, for objects to be displayed behind the screen, a negative disparity may be assigned, such that in a "left eye" picture, pixels for the object are positioned to the left of corresponding pixels in the "right eye" picture. The relative horizontal shift may be determined as a function of the amount of depth to be achieved, the relative horizontal offset, distance to the convergence plane, real-world distances, camera parameters, and the like.

In this manner, view synthesis unit 66 may synthesize a picture of a view to be used as a reference picture. View synthesis unit 66 may use similar processes to synthesize either or both of a texture image and/or a depth map. Thus, video encoder 20 may code a texture image and/or a depth map relative to a synthesized view component, e.g., a synthesized texture image or a synthesized depth map. View synthesis unit 66 may store data for the synthesized view component in reference frame memory 64. In this manner, mode select unit 40, motion estimation unit 42, and motion compensation unit 44 may treat the synthesized view component as if the synthesized view component were a conventional reference picture.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to code information indicative of whether view synthesis prediction is enabled for video data. When the information indicates that view synthesis prediction is enabled for the video data, video encoder 20 may generate a view synthesis picture using the video data and code at least a portion of a current picture relative to the view synthesis picture. The at least portion of the current picture may comprise, for example, a block (e.g., a PU, a CU, a macroblock, or a partition of a macroblock), a slice, a tile, a wavefront, or the entirety of the current picture.

Figure 3:
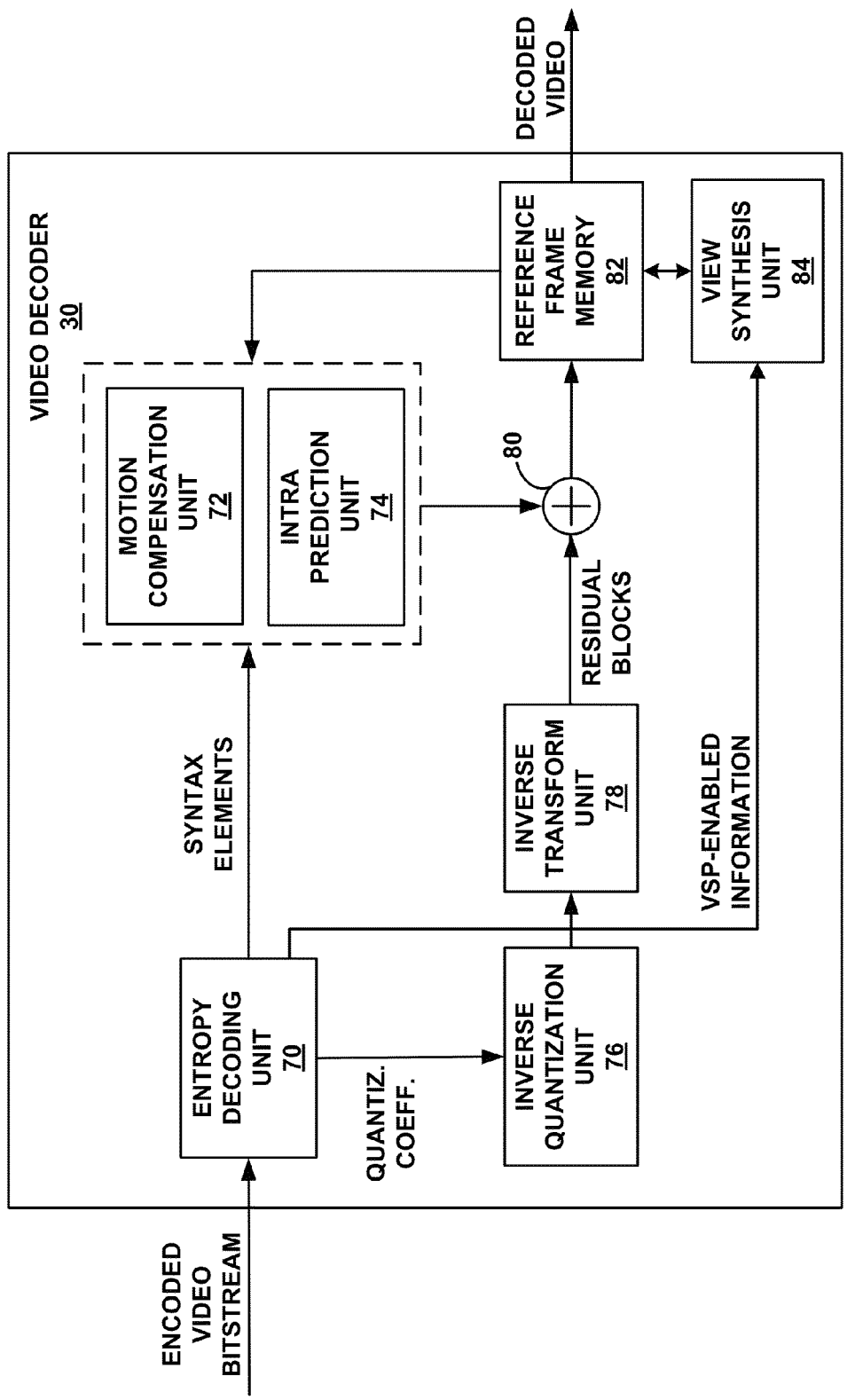
FIG. 3 is a block diagram illustrating an example of a video decoder that may implement techniques for coding information related to view synthesis prediction.

FIG. 3 is a block diagram illustrating an example of video decoder 30 that may implement techniques for coding information related to view synthesis prediction. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

In accordance with the techniques of this disclosure, video decoder 30 may receive syntax information indicating whether view synthesis prediction is enabled for any or all of a sequence of pictures, an individual picture, a slice, a tile, or a wavefront. In some examples, when the syntax information indicates that view synthesis prediction is disabled for a higher-order coded unit (e.g., a sequence of pictures), video decoder 30 may infer that view synthesis prediction is disabled for lower-order coded units (e.g., each of the pictures in the sequence of pictures). Thus, video decoder 30 need not receive syntax information indicative of whether view synthesis prediction is enabled for lower-order coded units when syntax information for a higher-order coded unit indicates that view synthesis prediction is not enabled.

The syntax information may correspond to the syntax information of Tables 1-5 discussed above. For example, video decoder 30 may be configured to decode a data structure (e.g., an SPS) corresponding to either of Tables 1 and 2 to determine whether view synthesis prediction is enabled for a sequence of pictures. When view synthesis prediction is enabled for a sequence of pictures, video decoder 30 may be configured to decode a data structure (e.g., a PPS) corresponding to Table 3 to determine whether view synthesis prediction is enabled for a particular picture in the sequence of pictures. Additionally or alternatively, when view synthesis prediction is enabled for a sequence of pictures (and, in some examples, for a particular picture in the sequence), video decoder 30 may be configured to decode a data structure (e.g., an APS) corresponding to Table 4 to determine whether view synthesis prediction is enabled for an individual slice (or, in some examples, a similar data structure for a tile or a wavefront). Additionally or alternatively, when view synthesis prediction is enabled for a sequence of pictures (and, in some examples, for a particular picture and/or slice in the sequence), video decoder 30 may be configured to decode a data structure (e.g., a slice header) corresponding to Table 5 to determine whether view synthesis prediction is enabled for an individual slice (or, in some examples, a similar data structure for a tile or a wavefront).

Entropy decoding unit 70 may decode the syntax information and send information indicating whether view synthesis prediction is enabled to view synthesis unit 84 (represented by "VPS-ENABLED INFORMATION" in FIG. 3). View synthesis unit 84 may be configured to operate in a manner substantially similar to that of view synthesis unit 66 (FIG. 2). For example, when view synthesis prediction is enabled, view synthesis unit 84 may use texture and depth information of previously decoded pictures, stored in reference frame memory 82, to generate a reference picture using view synthesis, that is, a view synthesis reference picture. View synthesis unit 84 may store the synthesized picture in reference frame memory 82. When view synthesis prediction is not enabled, view synthesis unit 84 need not generate a picture, which may conserve processing resources and/or battery power.

View synthesis unit 84 may use one or more reference views to synthesize another view. In some examples, view synthesis unit 84 may determine a horizontal location for the view to be synthesized, determine horizontal locations for previously coded views, and then select reference views based on the horizontal locations of the previously coded views. For example, view synthesis unit 84 may select a first reference view having a horizontal location that is closest to the left of the horizontal location of the view to be synthesized, and a second reference view having a horizontal location that is closest to the right of the horizontal location of the view to be synthesized.

View synthesis unit 84 may identify a reference view using view_ids and/or horizontal offset information. In examples where view_id values are used to identify reference views for view synthesis prediction, if both first reference view and second reference view can be identified, view synthesis unit 84 may synthesize the view synthesis reference picture from these two reference views, if two reference views are allowed. Otherwise, view synthesis unit 84 may only synthesize the view synthesis reference picture from one reference view. If only one reference view is allowed and the first and second reference views are both identified, the one with a closer view_id may be chosen. If both reference views have the same distance of view_id, view synthesis unit 84 may be configured to select the reference view with a smaller (or larger) view_id. In some examples, entropy decoding unit 70 may decode and provide syntax information to view synthesis unit 84 that indicates whether the smaller or larger view_id is to be chosen. Entropy decoding unit 70 may extract such syntax information from, e.g., an SPS or VPS, assuming that view synthesis prediction is indicated as being enabled.

In examples where horizontal translation information is used to identify reference views, if both the first reference view and the second reference view can be identified, view synthesis unit 84 may synthesize the view synthesis reference picture from these two reference views if two reference views are allowed. Otherwise, view synthesis unit 84 may only synthesize the view synthesis reference picture from one reference view. If only one reference view is allowed and the first and second reference views are both identified, the one with a closer horizontal location may be chosen. If both reference views have the same distance to the current view, view synthesis unit 84 may be configured to select the one on the left (or right). In some examples, entropy decoding unit 70 may decode and provide syntax information to view synthesis unit 84 that indicates whether the left or right horizontal location is to be chosen. Entropy decoding unit 70 may extract such syntax information from, e.g., an SPS or VPS, assuming that view synthesis prediction is indicated as being enabled.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra-prediction, temporal inter-prediction, or inter-view prediction) used to code the video blocks of the video slice, an inter-prediction slice type (e.g., B slice, P slice, or GPB slice), construction information for one or more of the reference picture lists for the slice, motion vectors (e.g., disparity motion vectors and/or temporal motion vectors) for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In accordance with the techniques of this disclosure, motion compensation unit 72 may perform inter-view prediction using disparity motion vectors. Such inter-view prediction may be relative to a previously decoded picture of another view or relative to a reference picture generated using view synthesis, assuming that view synthesis prediction is enabled. Accordingly, motion compensation unit 72 may be referred to as motion/disparity compensation unit 72.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 or intra-prediction unit 74 generates the predictive block for the current video block based on the motion vectors and other syntax elements, video decoder 30 forms a decoded video block by summing the residual blocks from inverse transform unit 78 with the corresponding predictive block. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference frame memory 82 also stores decoded video for later presentation on a display device, such as display device 32 of FIG. 1.

In this manner, video decoder 30 of FIG. 3 represents an example of a video decoder configured to code information indicative of whether view synthesis prediction is enabled for video data. When the information indicates that view synthesis prediction is enabled for the video data, video decoder 30 may generate a view synthesis picture using the video data and code at least a portion of a current picture relative to the view synthesis picture. The at least portion of the current picture may comprise, for example, a block (e.g., a PU, a CU, a macroblock, or a partition of a macroblock), a slice, a tile, a wavefront, or the entirety of the current picture.

Figure 4:
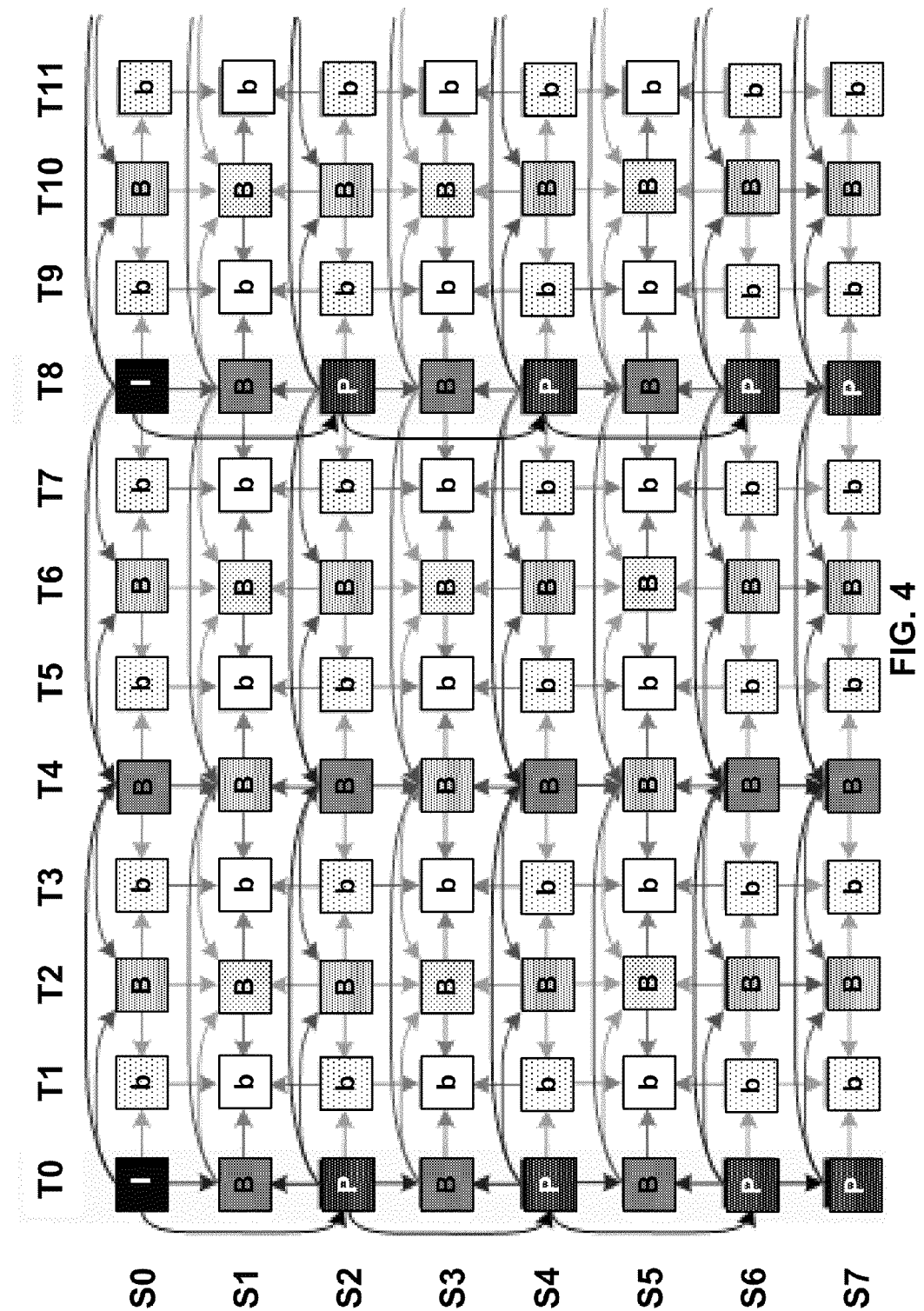
FIG. 4 is a conceptual diagram illustrating an example multi-view video coding (MVC) prediction pattern.

FIG. 4 is a conceptual diagram illustrating an example MVC prediction pattern. Multi-view video coding (MVC) is an extension of ITU-T H.264/AVC. A similar technique may be applied to HEVC. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

Although MVC has a so-called base view which is decodable by H.264/AVC decoders and stereo view pair could be supported also by MVC, one advantage of MVC is that it could support an example that uses more than two views as a 3D video input and decodes this 3D video represented by the multiple views. A renderer of a client having an MVC decoder may expect 3D video content with multiple views.

A typical MVC decoding order arrangement is referred to as time-first coding. An access unit may include coded pictures of all views for one output time instance. For example, each of the pictures of time T0 may be included in a common access unit, each of the pictures of time T1 may be included in a second, common access unit, and so on. The decoding order is not necessarily identical to the output or display order.

Frames in FIG. 4 are indicated at the intersection of each row and each column in FIG. 4 using a shaded block including a letter, designating whether the corresponding frame is intracoded (that is, an I-frame), or inter-coded in one direction (that is, as a P-frame) or in multiple directions (that is, as a B-frame). Frames designated as b-frames (that is, with a lowercase "b") may also be inter-coded in multiple directions, and generally refer to frames that are lower in a coding hierarchy in the view or temporal dimensions than B-frames (that is, with a capital "B"). In general, predictions are indicated by arrows, where the pointed-to frame uses the pointed-from object for prediction reference. For example, the P-frame of view S2 at temporal location T0 is predicted from the I-frame of view S0 at temporal location T0.

As with single view video encoding, frames of a multiview video coding video sequence may be predicatively encoded with respect to frames at different temporal locations. For example, the b-frame of view S0 at temporal location T1 has an arrow pointed to it from the I-frame of view S0 at temporal location T0, indicating that the b-frame is inter-predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references may be signaled in the Sequence Parameter Set (SPS) MVC extension and can be modified by the reference picture list construction process, which enables flexible ordering of the inter-prediction or inter-view prediction references.

In the MVC extension of H.264/AVC, inter-view prediction is allowed among pictures in the same access unit (that is, pictures having the same time instance). When coding a picture in one of the non-base views, a picture may be added into a reference picture list, if it is in a different view but with a same time instance. An inter-view prediction reference picture can be put in any position of a reference picture list, just like any inter prediction reference picture.

In the MVC extension of H.264/AVC, as an example, inter-view prediction is supported by disparity motion compensation, which uses the syntax of the H.264/AVC motion compensation, but allows a picture in a different view to be used as a reference picture. Coding of two views can be supported by MVC, which is generally referred to as stereoscopic views. One of the advantages of MVC is that an MVC encoder could take more than two views as a 3D video input and an MVC decoder can decode such a multiview representation. So, a rendering device with an MVC decoder may expect 3D video contents with more than two views.

Table 6 below represents the ITU-T H.264/AVC MVC extension for a sequence parameter set, generally referred to herein as the "SPS MVC extension."

TABLE 6

|  | C | Descriptor |
|---|---|---|
| seq_parameter_set_mvc_extension( ) { | | |
|   num_views_minus1 | 0 | ue(v) |
|   for(i = 0; i <= num_views_minus1; i++) | | |
|     view_id[i] | 0 | ue(v) |
|   for(i = 1; i <= num_views_minus1; i++) { | | |
|     num_anchor_refs_l0[i] | 0 | ue(v) |
|     for(j = 0; j < num_anchor_refs_l0[i]; j++) | | |
|       anchor_ref_l0[i][j] | 0 | ue(v) |
|     num_anchor_refs_l1[i] | 0 | ue(v) |
|     for(j = 0; j < num_anchor_refs_l1[i]; j++) | | |
|       anchor_ref_l1[i][j] | 0 | ue(v) |
| } | | |
|   for(i = 1; i <= num_views_minus1; i++) { | | |
|     num_non_anchor_refs_l0[i] | 0 | ue(v) |
|     for(j = 0; j < num_non_anchor_refs_l0[i]; j++) | | |
|       non_anchor_ref_l0[i][j] | 0 | ue(v) |
|     num_non_anchor_refs_l1[i] | 0 | ue(v) |
|     for(j = 0; j < num_non_anchor_refs_l1[i]; j++) | | |
|       non_anchor_ref_l1[i][j] | 0 | ue(v) |
| } | | |
|   num_level_values_signaled_minus1 | 0 | ue(v) |
|   for(i = 0; i <= num_level_values_signaled_minus1; i++) { | | |
|     level_idc[i] | 0 | u(8) |
|     num_applicable_ops_minus1[i] | 0 | ue(v) |
|     for(j = 0; j <= num_applicable_ops_minus1[i]; j++) { | | |
|       applicable_op_temporal_id[i][j] | 0 | u(3) |

TABLE 6-continued

| | C | Descriptor |
|---|---|---|
| applicable_op_num_target_views_minus1[i][j] | 0 | ue(v) |
|   for(k = 0; k <= applicable_op_num_target_views_minus1[i][j]; k++) | | |
|     applicable_op_target_view_id[i][j][k] | 0 | ue(v) |
|   applicable_op_num_views_minus1[i][j] | 0 | ue(v) |
|   } | | |
| } | | |
| } | | |

In the example of the SPS MVC extension of Table 6, for each view, the number of views that can be used to form reference picture list 0 and reference picture list 1 are signaled. A prediction relationship for an anchor picture, as signaled in the SPS MVC extension, can be different from the prediction relationship for a non-anchor picture (signaled in the SPS MVC extension) of the same view.

In the example of the MVC extension of ITU-T H.264/ AVC, an MVC NAL unit contains a one-byte NAL unit header (including the NAL unit type and the nal_ref_idc syntax element) and a three-byte MVC NAL unit header extension, if the NAL unit type is a prefix NAL unit or a MVC VCL NAL unit. The NAL unit header extension contains the following syntax elements in the example of the MVC extension: nor_idr_flag to indicate whether the NAL unit belongs to an IDR access unit that can be used as an closed-GOP random access point; priority_id that can be used for simple, one-dimension adaptation; view_id to indicate the view identifier of the current view; temporal_id to indicate the temporal level of the current NAL unit; anchor_pic_flag to indicate whether the NAL unit belongs to an anchor picture that can be used as an open-GOP random access point; and inter_view_ flag to indicate whether the view component is used for inter-view prediction for NAL units in other views. The prefix NAL unit in MVC contains only a NAL unit header and its MVC NAL unit header extension.

Views S0 to S7 of FIG. 4 represent examples of coded views, that is, views for which coded information is provided in a bitstream. In accordance with the techniques of this disclosure, additional views may be synthesized between views S0 to S7. For example, a view may be synthesized between views S0 and S1. To synthesize a picture of such a view, texture and depth information of pictures in views S0 and S2 may be used. For example, to synthesize a reference picture at time T1, texture and depth information from the pictures at time T1 from views S0 and/or S2 may be used. A video coder, such as video encoder 20 or video decoder 30, may interpolate pixel data for such a picture of a synthesized view to be used as a reference for coding another picture, e.g., a picture of view S1 at time T1.

In accordance with the techniques of this disclosure, syntax information may be provided indicating whether view synthesis prediction is enabled, e.g., for the bitstream including data for views S0 to S7 or for an operation point of such a bitstream. For example, an operation point may include views S0, S1, and S2. Syntax information for this operation point may indicate that view synthesis prediction is not enabled. Thus, when coding this operation point, a video coding device need not generate data for a synthesized view, which may conserve processing resources and battery power. However, syntax information for another operation point, e.g., an operation point including views S0, S2, S3, and S4, may indicate that view synthesis prediction is enabled. In this example, a view may be synthesized between views S2 and S4 and used as a reference during view synthesis prediction to code pictures of view S3.

Figure 5:
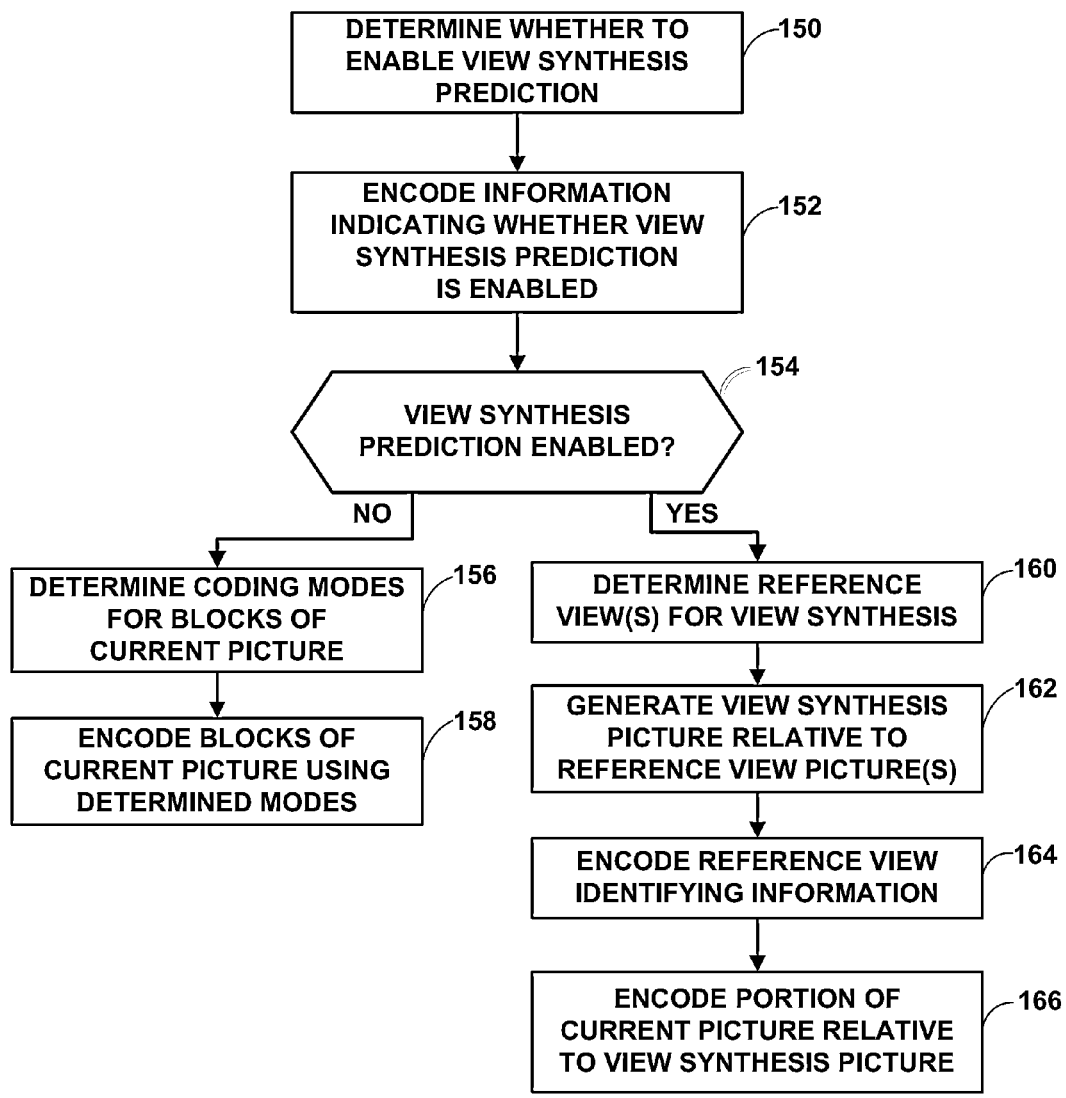
FIG. 5 is a flowchart illustrating an example method for coding information related to view synthesis prediction.

FIG. 5 is a flowchart illustrating an example method for coding information related to view synthesis prediction. The method of FIG. 5 is explained with respect to video encoder 20 (FIGS. 1 and 2). However, it should be understood that other video coding devices may be configured to perform a similar method. Moreover, certain steps in the method may be performed in a different order or in parallel. Likewise, certain steps may be omitted, and other steps may be added, in various examples.

In the example of FIG. 5, video encoder 20 determines whether to enable view synthesis prediction (15). For example, video encoder 20 may receive configuration data indicating whether view synthesis prediction should be enabled for a particular bitstream or operation point of a bitstream. Additionally or alternatively, video encoder 20 may test various coding modes, including view synthesis prediction, to determine a prediction mode or combination of prediction modes that yields acceptable coding performance. When enabling view synthesis prediction yields a sufficient gain in coding performance (e.g., weighed against the increase in processing resources and battery power), video encoder 20 may enable view synthesis prediction.

Video encoder 20 may also encode information indicating whether view synthesis prediction is enabled (152), based on the determination from step 150. For example, video encoder 20 may encode an SPS in accordance with one of Tables 1 and 2 to indicate whether view synthesis prediction is enabled for a sequence of pictures. When view synthesis prediction is enabled for at least one picture in the sequence, video encoder 20 may encode the SPS to indicate that view synthesis prediction is enabled for the sequence of pictures. On the other hand, when view synthesis prediction is not used for any of the pictures in the sequence, video encoder 20 may encode the SPS to indicate that view synthesis prediction is not enabled for the sequence of pictures.

When the SPS indicates that view synthesis prediction is enabled, video encoder 20 may further encode finer-grain data structures to indicate whether view synthesis prediction is enabled for lower-order coded units, such as individual pictures, slices, tiles, or wavefronts. Video encoder 20 may encode a PPS to indicate whether view synthesis prediction is enabled for a picture, as discussed with respect to Table 3. More particularly, video encoder 20 may encode various PPSs and code syntax information of a picture (e.g., a picture header or slice header) to refer to a PPS identifier (PPS id) of the one of the PPSs that indicates whether view synthesis prediction is enabled, as determined above. Similarly, video encoder 20 may encode an APS and/or a slice header, as discussed with respect to Tables 4 and 5, respectively, to indicate whether view synthesis prediction is enabled for a slice.

When view synthesis prediction is not enabled ("NO" branch of 154), video encoder 20 may determine coding modes for blocks of a current picture (156). The available coding modes may include intra-prediction, temporal inter-prediction, and inter-view prediction (assuming the current view is a non-base view). As discussed above, video encoder 20 may select a coding mode for each block of a picture or slice based on, e.g., RDO performance of various tested coding modes. Video encoder 20 may then encode the blocks of the current picture using the respective determined modes (158). In this manner, when view synthesis prediction is not enabled, video encoder 20 may encode blocks of a current picture without reference to any view synthesis pictures.

On the other hand, when view synthesis prediction is enabled ("YES" branch of 154), video encoder 20 may determine one or more reference views for performing view synthesis (160). For example, as discussed above, video encoder 20 may identify the reference views using view_id values and/or horizontal translation information. Video encoder 20 may then generate a view synthesis picture relative to the one or more reference view pictures (162). Video encoder 20 may also encode reference view identifying information (164). Video encoder 20 may further encode at least a portion of a current picture relative to the view synthesis picture (166). In particular, video encoder 20 may select a coding mode for each block of the current picture, which may include a view synthesis prediction mode. Because video encoder 20 enabled view synthesis prediction for the current picture, at least a portion of the current picture (e.g., a slice, tile, wavefront, or one or more blocks) of the current picture may be encoded relative to the view synthesis reference picture.

In this manner, the method of FIG. 5 represents an example of a method including coding information indicative of whether view synthesis prediction is enabled for video data, and when the information indicates that view synthesis prediction is enabled for the video data, generating a view synthesis picture using the video data, and coding at least a portion of a current picture relative to the view synthesis picture. As noted above, on the other hand, when the information indicates that view synthesis prediction is not enabled for the video data, the method may include coding the current picture using at least one of intra-prediction, temporal inter-prediction, and inter-view prediction without reference to any view synthesis pictures.

Figure 6:
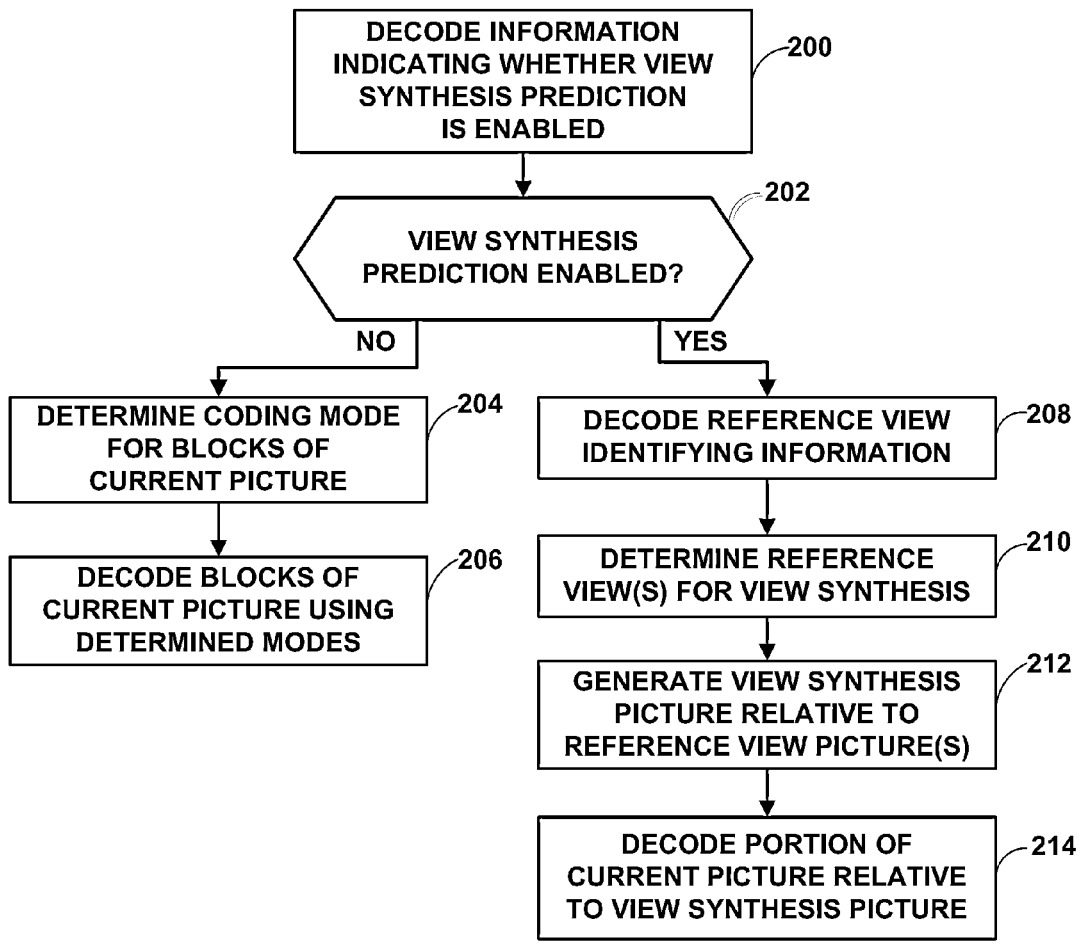
FIG. 6 is a flowchart illustrating another example method for coding information related to view synthesis prediction.

FIG. 6 is a flowchart illustrating an example method for coding information related to view synthesis prediction. The method of FIG. 6 is explained with respect to video decoder 30 (FIGS. 1 and 3). However, it should be understood that other video coding devices may be configured to perform a similar method. Moreover, certain steps in the method may be performed in a different order or in parallel. Likewise, certain steps may be omitted, and other steps may be added, in various examples.

Initially, video decoder 30 may decode information indicating whether view synthesis prediction is enabled (200). The information may include a hierarchical arrangement of information, as discussed with respect to Tables 1-5. For example, if an SPS indicates that view synthesis prediction is enabled for a sequence of pictures, video decoder 30 may determine, for each picture in the sequence, whether view synthesis prediction is enabled, e.g., using corresponding PPS data structures. Additionally or alternatively, if view synthesis prediction is enabled for a sequence of pictures or an individual picture in the sequence, video decoder 30 may further determine whether view synthesis prediction is enabled for an individual slice (or tile or wavefront), e.g., using data signaled in an APS and/or a slice header (or tile header or wavefront header, or corresponding parameter set data structures).

When the information indicates that view synthesis prediction is not enabled ("NO" branch of 202), video decoder 30 may determine a coding mode for blocks of a current picture (204), e.g., using syntax information signaled for the blocks. Video decoder 30 need not generate a view synthesis reference picture in this case, which may conserve processing resources and/or battery power. Video decoder 30 may then decode the blocks of the current picture using the respective determined coding modes (206), e.g., intra-prediction, temporal inter-prediction, and/or inter-view prediction. In this manner, when the information indicates that view synthesis prediction is not enabled for the video data, video decoder 30 may decode the current picture using at least one of intra-prediction, temporal inter-prediction, and inter-view prediction without reference to any view synthesis pictures.

On the other hand, when the information indicates that view synthesis prediction is enabled ("YES" branch of 202), video decoder 30 may decode reference view identifying information (208), e.g., a view_id and/or horizontal offset information. Using this identifying information, video decoder 30 may determine one or more reference views to be used for view synthesis (210). Video decoder 30 may then generate a view synthesis picture relative to pictures of the one or more reference views (212). Video decoder 30 may further decode at least a portion (e.g., one or more blocks, slices, tiles, wavefronts, or even the entire picture) relative to the view synthesis picture (214).

In this manner, the method of FIG. 6 represents an example of a method including coding information indicative of whether view synthesis prediction is enabled for video data, and when the information indicates that view synthesis prediction is enabled for the video data, generating a view synthesis picture using the video data, and coding at least a portion of a current picture relative to the view synthesis picture. As noted above, on the other hand, when the information indicates that view synthesis prediction is not enabled for the video data, the method may include coding the current picture using at least one of intra-prediction, temporal inter-prediction, and inter-view prediction without reference to any view synthesis pictures.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    coding information indicative of whether view synthesis prediction is enabled for one or more pictures of video data;
    based on the information indicating that view synthesis prediction is enabled for the one or more pictures of the video data:
        generating a view synthesis picture using the one or more pictures of the video data;
        coding a value representative of a selected coding mode for at least a portion of a current picture of the one or more pictures that indicates whether the at least a portion is predicted using a view synthesis prediction coding mode, wherein the value is separate from the information indicative of whether view synthesis prediction is enabled for the one or more pictures; and
        based on the value indicating that the at least a portion is predicted using the view synthesis prediction coding mode, coding the at least a portion relative to the view synthesis picture.

2. The method of claim 1, wherein coding the information comprises coding a syntax element of a parameter set corresponding to the at least a portion of the current picture.

3. The method of claim 2, wherein coding the syntax element comprises coding a syntax element of a sequence parameter set corresponding to a sequence of pictures including the one or more pictures, such that the syntax element indicates whether view synthesis prediction is enabled for the corresponding sequence of pictures.

4. The method of claim 2, wherein coding the syntax element comprises coding a syntax element of at least one of a picture parameter set corresponding to the current picture and an access unit level parameter set corresponding to a slice comprising the at least a portion of the current picture.

5. The method of claim 4, wherein the access unit level parameter set comprises one of an adaptation parameter set and a depth parameter set.

6. The method of claim 1, wherein the at least a portion of the current picture comprises a current slice, and wherein coding the information comprises coding a syntax element of a slice header for the current slice.

7. The method of claim 1, further comprising coding identifying information for a reference view to use to generate the view synthesis picture, wherein generating the view synthesis picture comprises generating the view synthesis picture relative to a picture of the reference view.

8. The method of claim 7, wherein coding the identifying information comprises coding a value based on a view identifier (view_id) for the reference view.

9. The method of claim 7, wherein coding the identifying information comprises coding a value based on horizontal translation information for the reference view.

10. The method of claim 1, further comprising, based on the information indicating that view synthesis prediction is not enabled for the video data, coding the current picture using at least one of intra-prediction, temporal inter-prediction, and inter-view prediction without reference to any view synthesis pictures.

11. The method of claim 1, wherein when the information indicates that view synthesis prediction is not enabled for the video data, view synthesis pictures are not generated while coding the video data.

12. The method of claim 1, wherein coding the at least a portion of the current picture comprises decoding the at least a portion of the current picture.

13. The method of claim 1, wherein coding the at least a portion of the current picture comprises encoding the at least a portion of the current picture.

14. The method of claim 1, wherein the at least a portion of the current picture comprises a prediction unit of a coding unit of the current picture, and wherein the value comprises a value for a syntax element representative of a coding mode for the prediction unit.

15. A device for coding video data, the device comprising:
a memory configured to store video data; and
a video coder configured to:
- code information indicative of whether view synthesis prediction is enabled for one or more pictures of the video data, and
- based on the information indicating that view synthesis prediction is enabled for the one or more pictures of the video data, to:
  - generate a view synthesis picture using the one or more pictures of the video data,
  - code a value representative of a selected coding mode for at least a portion of a current picture of the one or more pictures that indicates whether the at least a portion is predicted using a view synthesis prediction coding mode, wherein the value is separate from the information indicative of whether view synthesis prediction is enabled for the one or more pictures, and
  - based on the value indicating that the at least a portion is predicted using the view synthesis prediction coding mode, code the at least a portion relative to the view synthesis picture.

16. The device of claim 15, wherein the video coder is configured to code a syntax element of a parameter set corresponding to the at least a portion of the current picture.

17. The device of claim 16, wherein the video coder is configured to code a syntax element of a sequence parameter set corresponding to a sequence of pictures including the one or more pictures, such that the syntax element indicates whether view synthesis prediction is enabled for the corresponding sequence of pictures.

18. The device of claim 16, wherein the video coder is configured to code a syntax element of at least one of a picture parameter set corresponding to the current picture and an access unit level parameter set corresponding to a slice comprising the at least a portion of the current picture.

19. The device of claim 15, wherein the at least a portion of the current picture comprises a current slice, and wherein the video coder is configured to code a syntax element of a slice header for the current slice.

20. The device of claim 15, wherein the video coder is further configured to code identifying information for a reference view to use to generate the view synthesis picture, and wherein the video coder is configured to generate the view synthesis picture relative to a picture of the reference view.

21. The device of claim 20, wherein the video coder is configured to code a view identifier (view_id) for the reference view as the identifying information.

22. The device of claim 20, wherein the video coder is configured to code horizontal translation information for the reference view as the identifying information.

23. The device of claim 15, wherein when the information indicates that view synthesis prediction is not enabled for the video data, the video coder is configured to code the current picture using at least one of intra-prediction, temporal inter-prediction, and inter-view prediction without reference to any view synthesis pictures.

24. The device of claim 15, wherein the video coder comprises a video decoder.

25. The device of claim 15, wherein the video coder comprises a video encoder.

26. The device of claim 15, wherein the device comprises at least one of:
- an integrated circuit;
- a microprocessor; and
- a wireless communication device that includes the video coder.

27. A device for coding video data, the device comprising:
- means for coding information indicative of whether view synthesis prediction is enabled for one or more pictures of video data;
- means for generating a view synthesis picture using the one or more pictures of the video data based on the information indicating that view synthesis prediction is enabled for the one or more pictures of the video data;
- means for coding a value representative of a selected coding mode for at least a portion of a current picture of the one or more pictures that indicates whether the at least a portion is predicted using a view synthesis prediction coding mode based on the information indicating that view synthesis prediction is enabled for the one or more pictures of the video data, wherein the value is separate from the information indicative of whether view synthesis prediction is enabled for the one or more pictures; and
- means for coding the at least a portion relative to the view synthesis picture based on the information indicating that view synthesis prediction is enabled for the one or more pictures of the video data and based on the value indicating that the at least a portion is predicted using the view synthesis prediction coding mode.

28. The device of claim 27, wherein the means for coding the information comprises means for coding a syntax element of a parameter set corresponding to the at least a portion of the current picture.

29. The device of claim 28, wherein the means for coding the syntax element comprises means for coding a syntax element of a sequence parameter set corresponding to a sequence of pictures including the one or more pictures, such that the syntax element indicates whether view synthesis prediction is enabled for the corresponding sequence of pictures.

30. The device of claim 28, wherein the means for coding the syntax element comprises means for coding a syntax element of at least one of a picture parameter set corresponding to the current picture and an access unit level parameter set corresponding to a slice comprising the at least a portion of the current picture.

31. The device of claim 27, wherein the at least a portion of the current picture comprises a current slice, and wherein the means for coding the information comprises means for coding a syntax element of a slice header for the current slice.

32. The device of claim 27, further comprising means for coding identifying information for a reference view to use to generate the view synthesis picture, wherein the means for generating the view synthesis picture comprises means for generating the view synthesis picture relative to a picture of the reference view.

33. The device of claim 32, wherein the means for coding the identifying information comprises means for coding a view identifier (view_id) for the reference view.

34. The device of claim 32, wherein the means for coding the identifying information comprises means for coding horizontal translation information for the reference view.

35. The device of claim 27, further comprising means for coding, when the information indicates that view synthesis prediction is not enabled for the video data, the current picture using at least one of intra-prediction, temporal inter-prediction, and inter-view prediction without reference to any view synthesis pictures.

36. The device of claim 27, wherein the means for coding the at least a portion of the current picture comprises means for decoding the at least a portion of the current picture.

37. The device of claim 27, wherein the means for coding the at least a portion of the current picture comprises means for encoding the at least a portion of the current picture.

38. A non-transitory computer-readable storage medium having stored thereon instructions that, when executed, cause a processor to:
- code information indicative of whether view synthesis prediction is enabled for one or more pictures of video data;
- based on the information indicating that view synthesis prediction is enabled for the one or more pictures of the video data:
  - generate a view synthesis picture using the one or more pictures of the video data;
  - code a value representative of a selected coding mode for at least a portion of a current picture of the one or more pictures that indicates whether the at least a portion is predicted using a view synthesis prediction coding mode, wherein the value is separate from the information indicative of whether view synthesis prediction is enabled for the one or more pictures; and
  - based on the value indicating that the at least a portion is predicted using the view synthesis prediction coding mode, code the at least a portion relative to the view synthesis picture.

39. The non-transitory computer-readable storage medium of claim 38, wherein the instructions that cause the processor to code the information comprise instructions that cause the processor to code a syntax element of a parameter set corresponding to the at least a portion of the current picture.

40. The non-transitory computer-readable storage medium of claim 39, wherein the instructions that cause the processor to code the syntax element comprise instructions that cause the processor to code a syntax element of a sequence parameter set corresponding to a sequence of pictures including the one or more pictures, such that the syntax element indicates whether view synthesis prediction is enabled for the corresponding sequence of pictures.

41. The non-transitory computer-readable storage medium of claim 39, wherein the instructions that cause the processor to code the syntax element comprise instructions that cause the processor to code a syntax element of at least one of a picture parameter set corresponding to the current picture and an access unit level parameter set corresponding to a slice comprising the at least a portion of the current picture.

42. The non-transitory computer-readable storage medium of claim 38, wherein the at least a portion of the current picture comprises a current slice, and wherein the instructions that cause the processor to code the information comprise instructions that cause the processor to code a syntax element of a slice header for the current slice.

43. The non-transitory computer-readable storage medium of claim 38, further comprising instructions that cause the processor to code identifying information for a reference view to use to generate the view synthesis picture, wherein the instructions that cause the processor to generate the view synthesis picture comprise instructions that cause the processor to generate the view synthesis picture relative to a picture of the reference view.

44. The non-transitory computer-readable storage medium of claim 43, wherein the instructions that cause the processor to code the identifying information comprise instructions that cause the processor to code a view identifier (view_id) for the reference view.

45. The non-transitory computer-readable storage medium of claim 43, wherein the instructions that cause the processor to code the identifying information comprise instructions that cause the processor to code horizontal translation information for the reference view.

46. The non-transitory computer-readable storage medium of claim 38, further comprising instructions that cause the processor to, based on the information indicating that view synthesis prediction is not enabled for the video data, code the current picture using at least one of intra-prediction, temporal inter-prediction, and inter-view prediction without reference to any view synthesis pictures.

47. The non-transitory computer-readable storage medium of claim 38, wherein the instructions that cause the processor to code the at least a portion of the current picture comprise instructions that cause the processor to decode the at least a portion of the current picture.

48. The non-transitory computer-readable storage medium of claim 38, wherein the instructions that cause the processor to code the at least a portion of the current picture comprise instructions that cause the processor to encode the at least a portion of the current picture.

* * * * *